United States Patent [19]

Hösgen

[11] Patent Number: 5,084,234
[45] Date of Patent: Jan. 28, 1992

[54] ABSORPTION CASING FOR A SOURCE OF RADIOACTIVE RADIATION, PARTICULARLY FOR A NUCLEAR REACTOR

[76] Inventor: Karlheinz Hösgen, Gartzemer Str. 36, D-5353 Mechernich-Satzvey, Fed. Rep. of Germany

[21] Appl. No.: 454,604

[22] Filed: Dec. 21, 1989

[30] Foreign Application Priority Data

Dec. 31, 1988 [DE] Fed. Rep. of Germany ....... 3844466
Aug. 30, 1989 [DE] Fed. Rep. of Germany ....... 3928711

[51] Int. Cl.$^5$ .......................... G21C 11/00; G21F 1/12
[52] U.S. Cl. ................................... 376/288; 250/515.1
[58] Field of Search ............... 376/287, 288, 293, 339, 376/900, 272; 250/515.1, 517.1, 518.1, 519.1, 506.1, 507.1; 976/DIG. 157, DIG. 334

[56] References Cited

U.S. PATENT DOCUMENTS

| | | |
|---|---|---|
| 2,961,415 | 11/1960 | Axelrad ............................... 376/288 |
| 3,080,308 | 3/1963 | Dickinson .......................... 376/288 |
| 3,732,427 | 5/1973 | Trudeau et al. ................... 376/272 |
| 4,011,132 | 3/1977 | Kumpf et al. ...................... 376/287 |
| 4,090,083 | 5/1978 | Wyvill ................................. 376/254 |
| 4,192,714 | 3/1980 | Vachon ............................... 376/346 |
| 4,261,794 | 4/1981 | Yue ..................................... 376/287 |
| 4,735,768 | 4/1988 | Stehle et al. ....................... 376/414 |

FOREIGN PATENT DOCUMENTS 1396705  6/1975  United Kingdom ................ 376/288

OTHER PUBLICATIONS

"Introduction to Nuclear Engineering", Lamarsh, pp. 499, 12/77.
"Journal of Fusion Energy", Ragheb, pp. 285-298, 7/81.

Primary Examiner—Daniel D. Wasil
Attorney, Agent, or Firm—Diller, Ramik & Wight

[57] ABSTRACT

The absorption casing for the absorbing of radioactive radiation and fission products comprises four layers of different materials which retain the various kinds of radiation and the gaseous fission products. The first layer (36) consists of lead and absorbs the hard gamma radiation. The second layer (38) serves for the absorption of neutron radiation and consists of boron, hafnium, cadmium or beryllium. A third layer (42), consisting of aluminium, is provided for absorbing the alpha and beta radiation. Gaseous fission products are retained by a fourth layer (44) consisting of a zirconium alloy. The absorption casing provided with these layers is used for absorbing the radioactive radiation and for retaining the radioactive substances of the reactor of a nuclear power plant. In fast breeding reactors, a fifth layer (32), consisting of titanium, is used as an additional absorptive layer for absorbing the radioactive radiation issuing from the plutonium.

3 Claims, 2 Drawing Sheets

ABSORPTION CASING FOR A SOURCE OF RADIOACTIVE RADIATION, PARTICULARLY FOR A NUCLEAR REACTOR

BACKGROUND OF THE INVENTION

The invention is directed to an absorption casing for a source of radioactive radiation, particularly for a nuclear reactor, having a first layer for the absorption of gamma radiation, a second layer for the absorption of neutron radiation and a third layer for the absorption of alpha and beta radiation.

In nuclear reactors, a plurality of safety precautions are provided for preventing escape of direct radioactive radiation and radioactive fission products. For instance, the pressure vessel of the reactor in a nuclear power plant, being a steel containment, reduces the gamma radiation. The pressure vessel of the reactor is surrounded by a shield of steel-reinforced concrete, having a thickness of about two meters, which effects additional screening against the remaining gamma radiation and neutron radiation. The concrete safety container, having a sealing skin, and the reactor building present further barriers against the escape of radioactive radiation. Thus, for shielding the reactor, a plurality of comparatively thick walls are required. In their totality, all these barriers provide that, outside of the reactor, escape of direct radiation is possible only to an allowable extent. If one of these barriers fails due to leakage, there is no secure protection anymore against the issuing of radioactive radiation. Reliable protection against the gaseous radioactive fission products generated during nuclear reaction does not exist.

SUMMARY OF THE INVENTION

It is the object of the invention to provide an absorption casing for a source of radioactive radiation which effects reliable protection against intrusion or escape of radioactive fission products.

According to the invention, the object is solved in that a fourth layer of gas-impermeable material is provided, enclosing the source of radioactive radiation from all sides, for retaining the gaseous fission products.

According to the invention, the source of radioactive radiation is completely surrounded by a layer of gas-impermeable material. This fourth layer effects complete enclosure of the radioactive radiation source. Therefore, the radioactive fission products cannot escape and remain within the space enclosed by the fourth layer. Accordingly, the radioactive fission products cannot intrude into the remaining layers for absorption of the different types of radiation and contaminate these layers. By shielding the radioactive radiation source with respect to the radioactive fission products, these gaseous substances, being generated in a nuclear reaction, can be evacuated on a controlled basis without contaminating other protecting barriers.

Preferably, the fourth layer consists of a zirconium alloy. The layer of zirconium alloy, even if having a small thickness only, reliably shields the environment of the radioactive radiation source against gaseous fission products.

In principle, the succession of the individual layers is optional; however, the fourth layer of gas-impermeable material should be closest to the source of radiation so as to protect the subsequent layers against penetration by radioactive fission products.

The first layer for absorbing gamma radiation preferably consists of lead, the second layer for absorbing neutron radiation consists of boron, hafnium, cadmium or beryllium, and the third layer for absorbing alpha and beta radiation consists of aluminium. For effectively absorbing the radioactive radiation and for shielding off the gaseous radioactive fission products, respectively, the absorption casing need only have a comparatively small thickness because the individual layers, even when of comparatively small thickness, already accomplish effective absorption of radiation and shielding against the radioactive substances. By the series of layers of the invention, the radioactive rays (alpha, beta, gamma and neutron radiation) are effectively absorbed. The thickness of the individual layers substantially depends on the intensity of the radiation. The lead layer should be about three times as thick as each other layer. By the inventive casing for the absorption of radiation and fission products, the environment of plants having nuclear reactors is reliably protected. Therefore, the invention decisively contributes to the protection of the environment against radioactive contamination.

For protection against risks in nuclear power plants having light-water reactors, the above-mentioned four layers are sufficient. In "fast breeders" or "fast breeding reactors", in which plutonium is generated during nuclear fission, it is suitable to provide a fifth layer consisting of titanium. By this titanium layer, the radioactive radiation issuing from the plutonium is absorbed in a particularly effective manner.

Preferably, all of the layers are arranged at distances to each other to allow different expansion of the individual layers upon rise of temperature. Spacers can be arranged between the individual layers; preferably, between each pair of neigboring layers, there is arranged a layer of an elastic material to compensate the difference in expansion of neigboring layers.

The absorption casing of the invention can be used for linings in nuclear power plants, transport containers for radioactive materials, intermediate and final waste disposal sites for radioactive waste, as well as for nuclear fuel processing and reprocessing plants. Further, the absorption casing can be used for enclosures of atomic satellite drive units and for linings of X-ray rooms and laboratories. Additionally, the absorption casing of the invention can find application in the protection of fall-out shelter rooms, production sites and military buildings against radioactive radiation and substances.

For shielding the reactor of a nuclear power plant, an absorption casing according to the invention is preferably provided both on the inner side of the reactor building and on the inner side of the reactor safety container which is arranged within the reactor building. In both cases, the layer of zirconium alloy forms the layer closest to the reactor core. A further possibility for shielding the reactor consists in that the series of layers is integrated into the wall of the reactor building and the reactor safety container, the fourth layer (of zirconium alloy) being the innermost layer also in this case. By arranging the successive layers both at the reactor building and at the safety container or, respectively, on the walls of the reactor building and of the safety container, a double protection is given with respect to the reactor. Even in case of a maximum credible accident, involving the melting of the reactor core and—in the further course of the accident—of the concrete shell of the safety container, the absorption casing on the reactor building or in the wall thereof offers reliable protection against radioactive radiation and radioactive substances until destruction of the safety container as such.

Also for anti-radiation shielding of shut-down nuclear power plants, the absorption casing of the invention is applicable. In this case, the absorption casing is preferably arranged around the entire reactor building. This can particularly be achieved in that the series of layers is attached to the reactor building from the outside, with the layer of zirconium alloy being arranged on the inner side of the absorption casing facing the reactor building. For anti-radiation shielding of final radioactive-waste disposal sites, the absorption casing is preferably arranged around the entire final disposal site. Also here, the layer of zirconium alloy is located on the inner side of the absorption casing.

According to the respective intensity of the radioactive radiation to be shielded off, it can also suffice to close only the entrances to the final radioactive-waste disposal site by the absorption casing. Finally, the absorption casing of the invention is also suited for the protection of all kinds of installations against radioactive radiation and substances; in these cases, the layer of zirconium alloy is arranged on the outside of the absorption casing surrounding the installation to be protected.

The absorption casing of the invention is adapted to provide anti-radiation shielding of shut-down nuclear power plants by "secured containment" of the nuclear power plant. In this variant of an anti-radiation shielding, all solid and insoluble active substances are permanently contained in situ by a tight safety enclosure. The monitoring of technical safety systems and safe access to the shut-down plant are guaranteed over the whole time span of the containment. Access to the premises is possible then as before, and safety checks, performed by measuring devices, and the like procedures are possible at all times. The radiation exposure resulting from the "securely contained" shut-down nuclear power plant is considerably decreased by the inventive absorption casing. As compared to other nuclear waste disposal measures, complete containment of the shut-down nuclear power plant by a safety enclosure provided with the absorption casing can be obtained at relatively low costs.

An embodiment of the invention will be explained in greater detail hereunder with reference to the Figures, wherein

DESCRIPTION OF THE PREFERRED EMBODIMENTS

Figure 1:
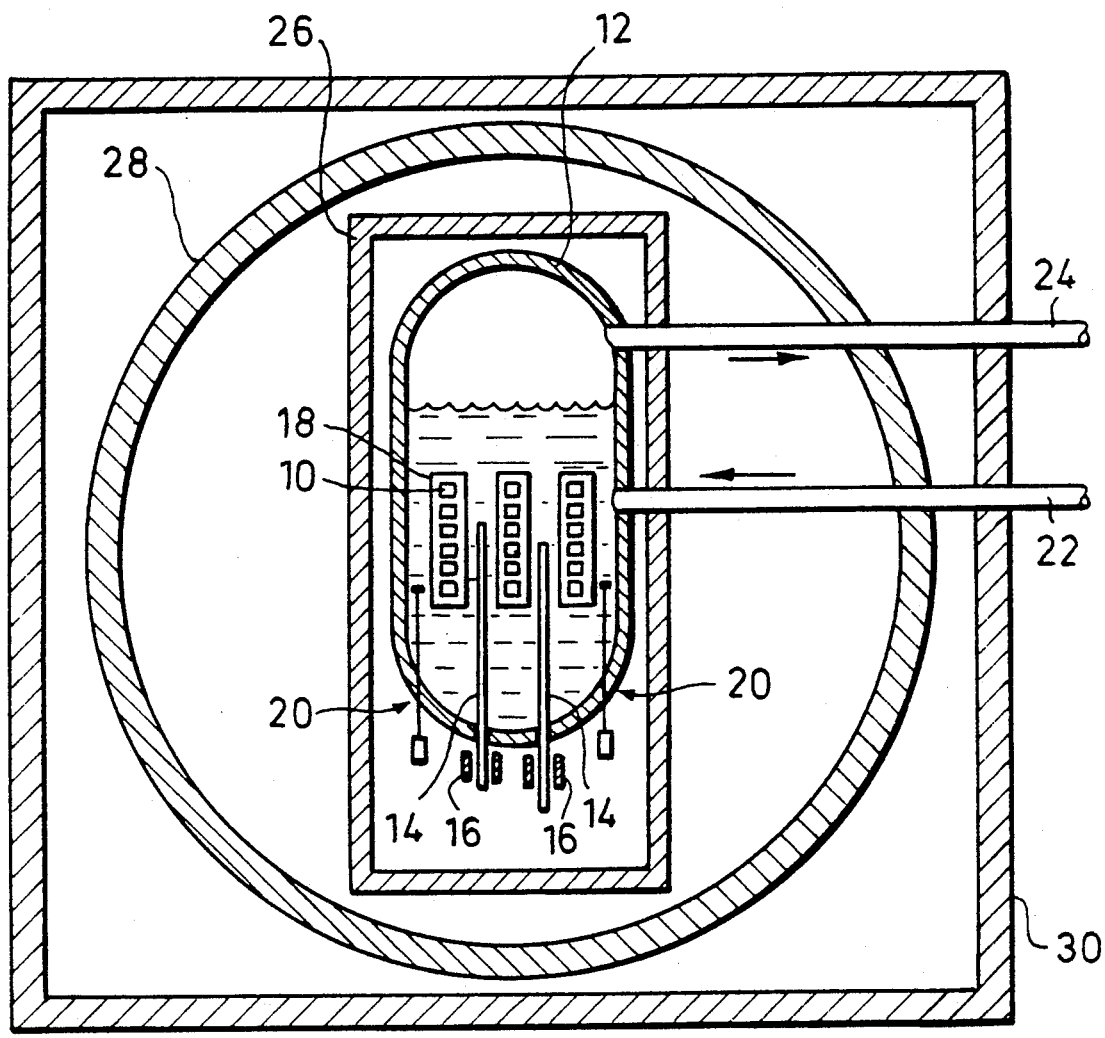
FIG. 1 is a schematic view of the reactor core and the essential components for the protection against escape of radioactive radiation and radioactive substances from the reactor.

In FIG. 1, the essential protecting components preventing escape of radioactive radiation and substances are schematically shown as provided in a boiling water reactor. The fuel elements 10, being each composed of a plurality of fuel rods, are arranged in a reactor pressure vessel 12 being filled with water to about two thirds of capacity. The reactor vessel 12 consists of a special steel and has a wall thickness of about 20 cm. For the controlling of the reactor core, i.e. for the controlling of the nuclear fission, the reactor vessel 12 has arranged therein a plurality of so-called control rods 14 which are provided between the fuel elements 10 and, by drive means 16 outside of reactor vessel 12, are displaceable in lengthwise direction. The fuel elements 10 have a cladding 18. Further, circulation pumps 20 for circulating the water are provided in the reactor vessel 12. A feedwater line 22 and a steam discharge conduit 24 are connected to the reactor vessel 12. The water coming from the condenser flows, via conduit 22, into the reactor vessel 12, is heated therein due to the energy released during nuclear fission and, at the same time, is evaporated. Through conduit 24, the water issues from the reactor vessel 12 and reaches the turbines.

The reactor vessel 12 is surrounded by a concrete shell 26, having a thickness of about two meters, which is also called a biological shield. The reactor vessel and the concrete shell thereof are accommodated in a steel-made safety container having a wall thickness of about 3 cm. The safety container 28 has its outside provided with a sealing skin having a wall thickness of about 4 mm. The safety container 28 is arranged within the reactor building 30. The reactor building consists of steel-reinforced concrete and primarily serves for protection against external influences.

Figure 2:
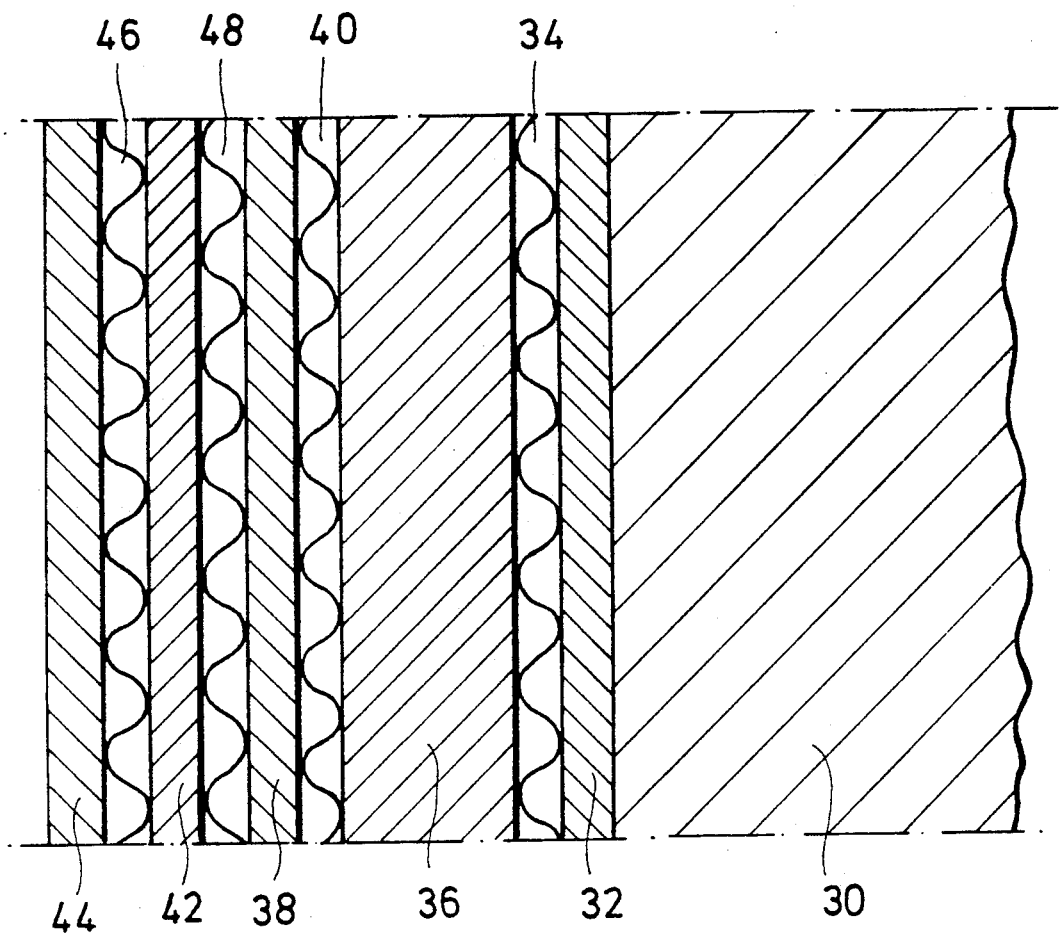
FIG. 2 is an enlarged view of the arrangement of the absorption casing on the inner side of the wall of the reactor building.

The absorption casing of the invention is arranged on the respective inner side of the safety container 28 and of the reactor building 30. The absorption casing consists of a plurality of layers. Hereunder, the construction and the series of the layers are described with respect to an absorption casing which is arranged on the inner side of the reactor building 30 (FIG. 2). The inner surface of the wall of the reactor building 30 has a layer 32 of titanium applied thereto. This titanium layer 32 is provided for absorbing the radioactive radiation of plutonium and, therefore, is necessary only with fast breeding reactors wherein plutonium is obtained upon nuclear fission. Nonetheless, the titanium layer 32 has been included in FIG. 2 for reasons of completeness. On the titanium layer, there is provided a layer 34 of an elastic material having a thick layer 36 of lead arranged thereon. The lead layer 36 serves for absorbing the gamma radiation. As seen from the reactor core, a layer 38 of cadmium, boron, hafnium or beryllium for the absorption of neutron radiation is arranged before the lead layer 36. The interspace between the layer 38 and the lead layer 36 is filled by a layer 40 of elastic material. At a distance to the layer 38, there is arranged a layer 42 of aluminium for absorbing the alpha and beta radiation. Finally, on the inner side of the aluminium layer 42 being averted from layer 38, a layer 44 of a zirconium alloy is provided. The zirconium-alloy layer 44 prevents escape of gaseous fission products and, forming the innermost layer on the inside of the absorption casing, has the smallest distance to the nuclear reactor. The interspace between the zirconium-alloy layer 44 and the aluminium layer 42 as well as the interspace between the aluminium layer 42 and the layer 38 are filled with elastic material 46 and 48, respectively.

The individual layers 42-44 are assembled from individual plate members. All of the plates of the same layer are bolted to each other; the plates of different layer are also bolted to each other. The elastic material of the layers 34, 40, 46 and 48 compensates the mechanical stresses in the absorption casing which are caused by the differences in expansion and shrinking of the layers upon heating and cooling, respectively.

The absorption casing of the invention can also consist of self-supporting layers. In this case, the zirconium-alloy layer 44, the aluminium layer 42, the layer 38 of cadmium, boron, hafnium or beryllium, the lead layer 36 and, if provided, the titanium layer 32 will be arranged at mutual distances; the interspaces in this case can remain substantially free of material so that the layers of elastic material can be omitted. Instead of these layers 34, 40, 46 and 48 of elastic material, deformable spacers can be used which are fastened to the layers between which they are arranged.

As already mentioned, the innermost layer 44 is made from a zirconium alloy. As a material for the layer 44, Zircaloy is particularly suited (Zircaloy is a registered trademark). However, also every other zirconium alloy offering reliable protection against gaseous fission products can be used as a material for the layer 44. The thickness of the individual layers for absorbing alpha, beta, gamma and neutron radiation and for sealing the absorption casing against gaseous fission products is chosen in dependence of the intensity of radiation. As to the thickness of the individual layers relative to each other, it is to be noted that the zirconium-alloy layer 44, the aluminium layer 42, the layer 38 of cadmium, boron, hafnium or beryllium, and the titanium layer 32 have substantially the same thickness while the lead layer 36 is substantially of triple thickness in comparison to each of the before-mentioned layers. The relation of the individual layers with respect to their thickness is graphically rendered in FIG. 2; in this graphic representation, the steel-reinforced concrete wall of the reactor building 30, having a thickness of about 1.50 m, can be shown in part only.

I claim:

1. An absorption casing for a source of radioactive radiation comprising a first layer (36) having means for absorbing gamma radiation, a second layer (38) having means for absorbing neutron radiation, a third layer (42) having means for absorbing alpha and beta radiation, a fourth layer (44) having gas-impermeable means for enclosing a source of radioactive radiation and for retaining gaseous fission products, said first through fourth layers being disposed in consecutive adjacent relationship to each other, all said first through fourth layers (36, 38, 42 and 44) being spaced from each other and surrounding a source of radioactive radiation with said fourth layer (44) being the layer closest to said source, said fourth layer (44) being zirconium or a zirconium alloy, and a layer (34, 40, 46, 48) of an elastic material being arranged between each pair of spaced adjacent layer (32, 36, 38, 42, 44) of said absorption casing.

2. The absorption casing as defined in claim 1 wherein the second layer (38) comprises hafnium.

3. The absorption casing as defined in claim 1 including a fifth layer (32) comprised of titanium.

* * * * *